US007827289B2

(12) United States Patent
Bucher et al.

(10) Patent No.: US 7,827,289 B2
(45) Date of Patent: Nov. 2, 2010

(54) LOCAL TRANSMISSION FOR CONTENT SHARING

(75) Inventors: Timothy Bucher, Los Altos, CA (US); Mark Andrew Ross, San Carlos, CA (US)

(73) Assignee: Dell Products, L.P., Round Rock, TX (US)

( * ) Notice: Subject to any disclaimer, the term of this patent is extended or adjusted under 35 U.S.C. 154(b) by 640 days.

(21) Appl. No.: 11/356,131

(22) Filed: Feb. 16, 2006

(65) Prior Publication Data

US 2007/0191008 A1 Aug. 16, 2007

(51) Int. Cl.
*G06F 15/16* (2006.01)
(52) U.S. Cl. ...................................... 709/227
(58) Field of Classification Search ................. 709/204, 709/205, 225, 229, 230, 231, 238, 243, 250, 709/227; 715/736, 740, 751; 725/54, 62, 725/63
See application file for complete search history.

(56) References Cited

U.S. PATENT DOCUMENTS 6,757,517 B2 6/2004 Chang

| | | |
|---|---|---|
| 2005/0160270 A1 | 7/2005 | Goldberg et al. |
| 2005/0289266 A1 | 12/2005 | Illowsky et al. |
| 2006/0193273 A1* | 8/2006 | Passier et al. ............... 370/310 |

FOREIGN PATENT DOCUMENTS

WO WO/03/093950 * 11/2003

* cited by examiner

*Primary Examiner*—William C Vaughn, Jr.
*Assistant Examiner*—Scott Christensen
(74) *Attorney, Agent, or Firm*—Workman Nydegger

(57) ABSTRACT

A personal media device transmits media content to one or more nearby personal media devices so that users can dynamically and easily share content. The method includes, on a first media player device having or having access to selected media content, playing the selected media content such that it can be listened to on a first user's headphones. The selected media content is also transmitted such that it can be received and simultaneously played by one or more authorized media player devices associated with additional users. The transmitted content is preferable secure so that only authorized users can access it. The media player devices receiving the transmitted content can be wireless headsets configured to receive and simultaneously play the content.

22 Claims, 2 Drawing Sheets

LOCAL TRANSMISSION FOR CONTENT SHARING

CROSS-REFERENCE TO RELATED APPLICATIONS

Not applicable.

BACKGROUND OF THE INVENTION

1. The Field of the Invention

The present invention relates generally to the field of portable audio devices. More particularly, the present invention provides for the wireless transmission of audio content from a single user to one or more additional nearby users.

2. The Relevant Technology

Numerous forms of personal portable media devices are proliferating today. One example is satellite radio, or Satellite Digital Audio Radio Service (SDARS), which is the broadcast of digital audio programming via satellites directly to users. Through satellite radio, subscribers can receive high quality, uninterrupted, digital data such as radio over more than one hundred radio channels, for example digital quality music, talk radio, sports, news, weather, and the like. Often, a user of satellite radio has a small portable device they use to receive the digital data stream. Other examples of portable media players are portable digital audio devices, often referred to as MP3 players, portable CD players, portable DVD players, notebook computers, and the like.

Regardless of the type of portable media device, it is often desirable for a user to play music from their portable media device such that their friends or others in their vicinity can hear it. Because portable media devices typically transmit their audio content to users by headphones, either wired or wireless, sharing audio content conventionally requires either sharing headphones or connecting to a speaker system. In fact, it is not uncommon to find users passing around a pair of headphones to one another, taking turns listening to the audio content. Not only is this cumbersome and unsanitary, but it prevents the users from simultaneously experiencing the shared content.

Accordingly, improved and simplified methods of sharing content between users of portable media devices are needed.

BRIEF SUMMARY OF THE INVENTION

The present invention overcomes the foregoing deficiencies of the prior art by allowing a user to wirelessly broadcast their content locally such that other users having portable media devices or compatible headsets can receive and play the media content.

Accordingly, a first example embodiment of the invention is a method for distributing media content to multiple users. The method generally includes: on a first media player device having or having access to selected audio content, playing the selected media content such that it can be listened to on a first user's headphones; and wirelessly transmitting the selected media content such that it can be received and simultaneously played by one or more authorized media player devices associated with additional users.

A second example embodiment of the invention is a personal wireless media player system. This system generally includes: a wireless headset and a personal media player device. The wireless headset is operable to receive a wireless audio transmission from a wireless transmission module. The personal media player device includes at least: a media player module having or having access to selected media content; and a wireless transmission system, wherein the wireless transmission system wirelessly is configured to transmit the selected media content in a secure transmission such that it can be received by a wireless device associated with at least one other user that is authorized to receive and play media content transmitted by the first personal media player device.

Yet another example embodiment of the invention is another method for distributing media content to multiple users. The method generally includes: providing a first personal media player device associated with a first user, the media player device having or having access to selected media content; and wirelessly transmitting the selected media content in a secure transmission such that it can be received by authorized wireless headsets, each associated with a user, that are configured to receive and play media content transmitted by the first personal media player device.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Reference will now be made to the Figures wherein like structures will be provided with like reference designations. It is understood that the drawings are diagrammatic and schematic representations of presently preferred embodiments of the invention, and are not limiting of the present invention nor are they necessarily drawn to scale.

In the following description, numerous specific details are set forth in order to provide a thorough understanding of the present invention. It will be obvious, however, to one skilled in the art that the present invention may be practiced without these specific details. In other instances, well-known aspects of media players, satellite radio, and wireless communications have not been described in particular detail in order to avoid unnecessarily obscuring the present invention.

Figure 1:
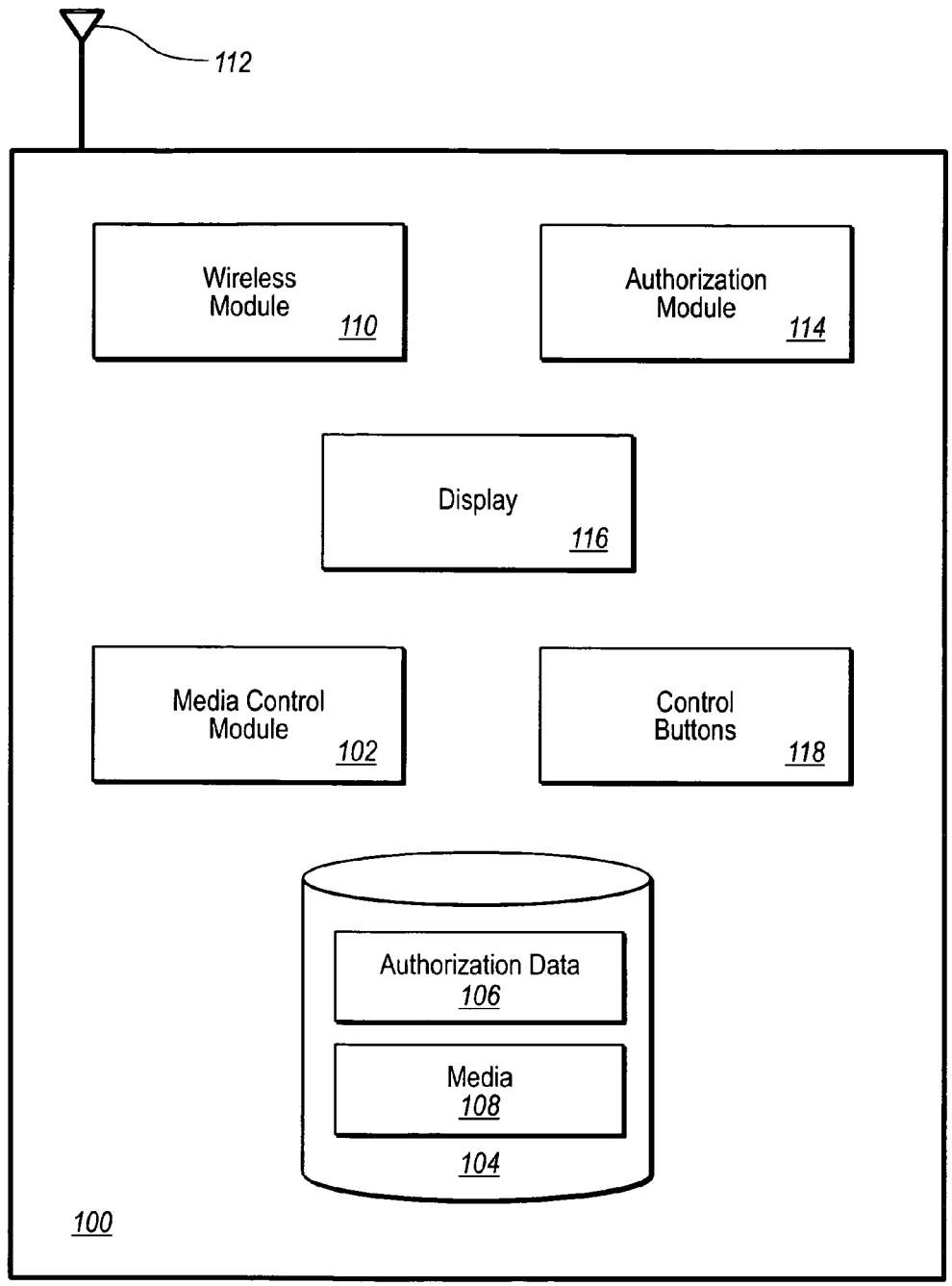
FIG. 1 illustrates a wireless media player device according to one embodiment of the invention.

FIG. 1 illustrates one preferred embodiment of a device 100 that can preferably house numerous modules or components used in generating, transmitting, receiving, and playing media between devices connected by a wireless signal. The wireless media player device 100 is capable of both communicating with a primary user and transmitting data to a wireless device associated with one or more additional users. To play media, preferably audio, the wireless media player device 100 includes a media control module 102, stored digital media content as denoted by media content 108 on memory source 104, and wireless module 110 in communication with antennae 112 for receiving satellite radio signals or transmitting content signals. While depicted as a single antenna, those skilled in the art will recognize that multiple antennas may be used for each distinct type of radio signal. Other components, such as those necessary to operate a satellite radio device, are not depicted to avoid unnecessarily obscuring the invention. The inclusion of such systems, however, will be apparent to one skilled in the art in view of the disclosure herein.

In this example, the device 100 is representative of both portable and non-portable devices that can receive content that includes digital audio and/or digital video data. Examples of the device 100 may include, by way of example, modules operable as a satellite radio receiver, a portable audio player (MP3 player), a portable DVD or CD player, a personal computer, a laptop computer, a cellular telephone, a personal digital assistant, and the like or any combination thereof.

The wireless transmission between devices can be any wireless system that is compatible with the devices and may include, by way of example only, satellite networks, 802.11 networks, personal computer networks (e.g., LAN, WAN), wireless networks (e.g., Bluetooth, WiFi), cellular networks, and the like or any combination thereof.

Media that can be played by wireless media player device 100 therefore includes different types of streamed or stored media, including digital media that may be received by the device 100. Examples of the content includes, but are not limited to, satellite radio broadcasts, terrestrial radio broadcasts, digital music, talk audio data, television data, movie data, podcasts, sports data, and the like or any combination thereof. The content can be either digital or analog in nature. The media content 108 stored in memory can be used to store the above content or other user and/or device data. The memory 104, for example, may store digital music and/or video, graphics, playlists, user preferences, device settings, and the like or any combination thereof. In addition, and as described in greater detail below, the memory 104 can include security and authentication data 106 to control the wireless distribution of data.

Typically, the device 100 also includes a display 116, or other means of conveying information to a user, that can convey information to the user of the device. The device 100 also includes control buttons 118 or other means of providing input to the device 100. The display 116 and control buttons 118 can be used to manually coordinate the transmission and receipt of wireless content between devices. The display 116 and control buttons 118 can also be used in some embodiments to control the authorization of secondary devices to receive content transmitted by a primary device. By way of example only, the display 116 and control buttons 118 can be used by a secondary user to select a wireless transmission they wish to tap into, request authorization directly from a transmitter device, or input an orally received password to access the wireless content.

In addition, when the device 100 renders digital audio data, the display 116 may indicate the song title, the artist, the album title, the track number, the length of the track, and the like or any combination thereof. The control buttons 118, by way of example, enable a user to navigate and perform the digital media that is stored on the memory 104 of the device 100 or to navigate and perform any digital media that is received from an external source. The control buttons 118 may also enable a user to switch to another channel such as in satellite radio.

Figure 2:
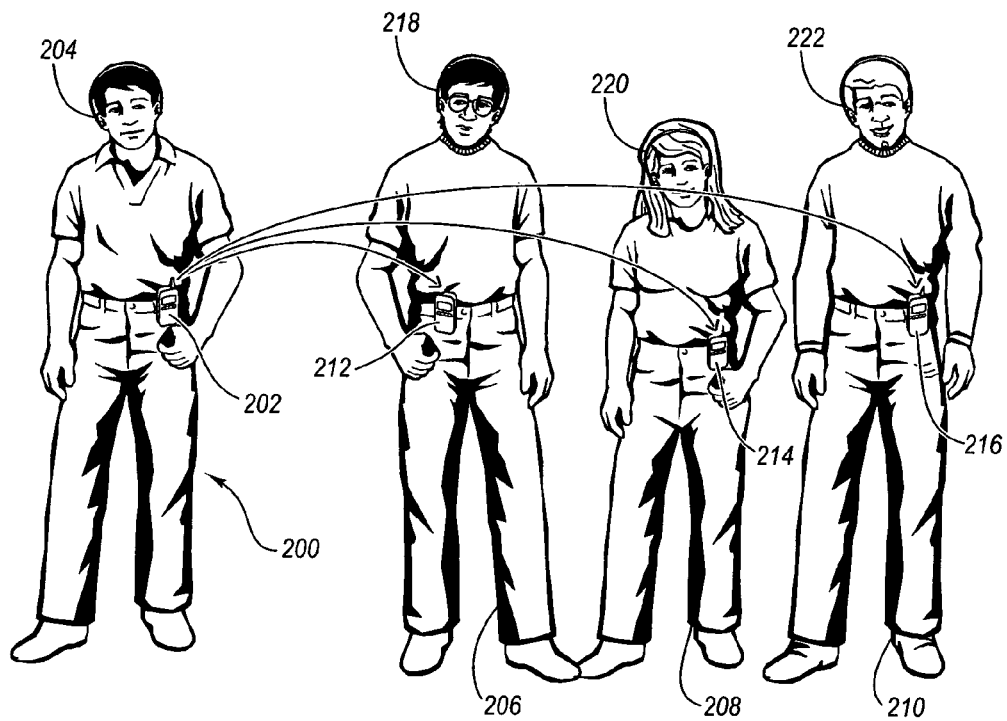
FIG. 2 illustrates the transmission of audio content between devices in a local ad hoc network according to one embodiment of the invention.
Figure 3:
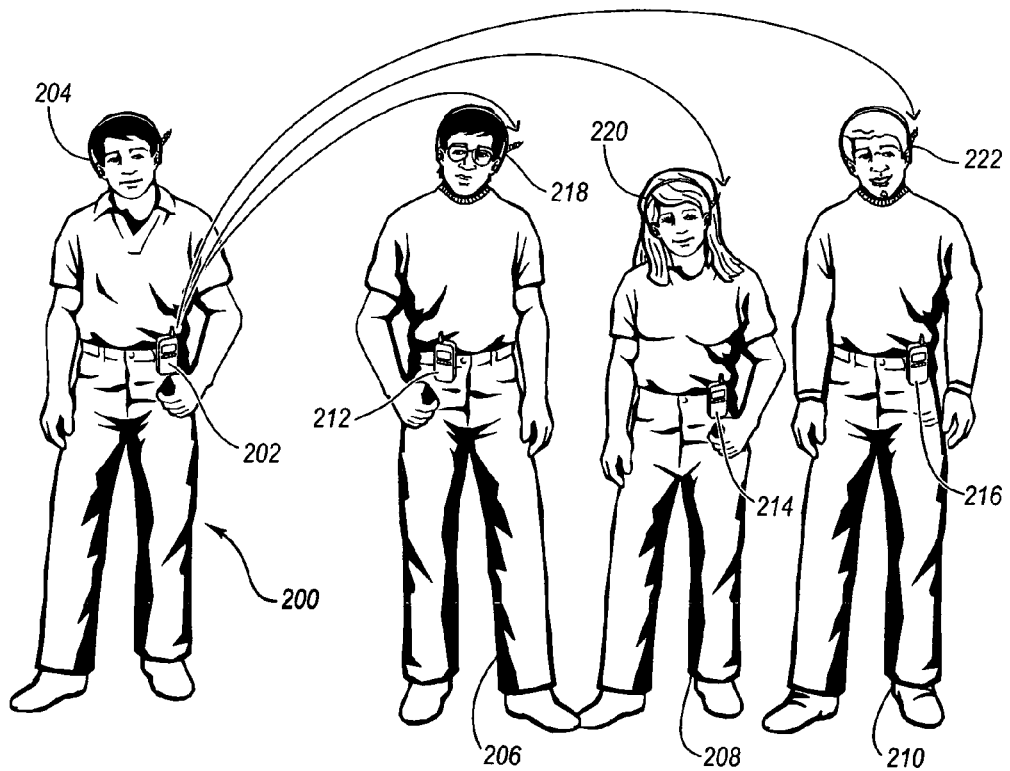
FIG. 3 illustrates the transmission of audio content between devices in a local ad hoc network according to another embodiment of the invention.

Referring now to FIGS. 2 and 3, embodiments of the invention provide for transmission of content from a first user to one or more additional users in the same vicinity. The shared content is preferably audio, but may also be combination of audio, video, images, text, and/or other information that can be communicated wirelessly. Wirelessly sharing content between nearby users provides for the dynamic and spontaneous sharing of content so that content of interest can be quickly shared. By way of example only, the first user could quickly share with nearby friends a recently discovered song.

In one aspect of the invention as illustrated in FIG. 2, the transmission from the first user's 200 media player device 202 is communicated to the first user's 200 headphones 204. Additionally, the transmission from the first user's 200 media player device 202 is received at the additional users' 206, 208, 210 media player devices 212, 214, 216. From there, the content can be communicated to the respective users in the appropriate fashion, for example through wireless headphones 218, 220, 222, wired headphones, speakers, and/or a display. As used herein, the term headphones includes headsets of various forms of devices having audio and visual devices, including for example headphones, paired earbuds, a single earbud, speakers attached to items such as glasses, and other audio or visual devices that have been, or will be developed, to play content to a user.

Alternatively, and as illustrated in FIG. 3, wireless headphones 218, 220, 222 can be configured to directly receive an audio transmission from the first user's media player device 202. As in FIG. 2, the transmission from the first user's 200 media player device 202 is also communicated to the first user's 200 headphones 204. In a preferred embodiment, each of the first user's media player devices 202 and the additional user's media player devices 212, 214, 216 can communicate to establish a group to enable the direct wireless transmission from the first user's media player device to the other user's headphones, in effect bypassing the second user's media player device. This has the distinct advantage of reducing the number of wireless transmissions, thereby improving transmission quality by eliminating a relay.

In yet another alternative embodiment of the invention, a hybrid of the previous two embodiments can be used where the additional users' media player devices 212, 214, 216 receive an initial transmission from the first device 202 and then configure a link between the first device 202 and the headphones 218, 220, 222 so that the secondary users' devices can be removed the subsequent wireless transmission of content between the first device 202 and the headphones 218, 220, 222. The secondary users' devices can thus be used to help coordinate the group sharing of content without adding an unnecessary link in the transmission of the content.

The various users linked together in a content sharing wireless network form an ad hoc network. Generally, such a wireless ad hoc network is a collection of autonomous devices, or nodes, that communicate with each other wirelessly in a decentralized manner. Since the devices communicate over wireless links, they have to contend with the effects of radio communication, such as noise, fading, and interference. The effects of interference and noise can be countered by shifting channels as conditions change and communicating between devices to effect the shifts. However, transmission delay, power, and bandwidth constraints of media content sharing on small mobile devices make staying with a channel to minimize bi-directional communications is preferable. Preferably, each device, or node, in a wireless ad hoc network functions as both a host and a router, although this is not necessary, and the control of the network is distributed among the devices. The network topology is generally dynamic in that devices may join or leave the network as they enter and leave range of one another, are turned on or off, or have access to the network added or removed.

Wireless transmission between the first user and the additional user(s) can be performed by one of three basic transmission methods: broadcast, unicast, and multicast. A broadcast is a single data stream that is transmitted such that any compatible device within the transmission range of the transmitting device can receive the data stream. One example is a local broadcast with a low power FM transmitter. In transmitting and receiving broadcasts, there is no way to intelligently control, on a case-by-case basis, which devices need or want the data or are authorized to receive it. Broadcasting has the advantage that it is simple to implement. It is limited, however, in that it broadcasts can overwhelm areas and can interfere with or crowd out other kinds of wireless traffic. For example, twenty users in a subway car, each with FM transmitters connected to their handheld audio players broadcasting their music, would have difficulty all finding open channels on which to broadcast.

Alternatively, data can be transmitted to the additional devices by transmitting with one or more unicasts. With a unicast design, devices can send one copy of each packet to each member of the group. Generally, each unicast is a separate copy of the data directed at a particular end device such that transmission between the devices is exclusive. A common example of a unicast is the Internet where users access data from a given web site in a one-to-one connection. Generating a separate; identical data stream for each receiver is often considered inefficient, but can suffice in small networks such as the small wireless networks described herein. Transmitting multiple unicast streams requires more processing power, memory, power, and bandwidth resources, particularly with data-intensive applications. When there are too many recipients, and when large amounts of data (e.g., streaming video) are being sent, unicast may become impractical. If these obstacles are not present, however, unicast is a preferred way to communicate data between devices.

A multicast, in turn, is a single data stream that is received by a defined group. Thus, whereas in unicast a sending device would need to send ten data streams for ten recipient devices to get the data, multicasting allows the sending devices to send only a single data stream. Unlike a broadcast, a multicast-enabled device is configured to forward a multicast signal to a particular device only if there are compatible multicast receivers on that device and the device is part of the appropriate multicast group.

Regardless of whether the content is broadcast, unicast, or multicast, certain inter-device communication, authentication and group management can or must be performed to coordinate the content transfer. For example, even if the content is non-securely broadcast by the first media player, the inventive systems can use display, audio cues, or automated wireless forms of communication so that the other devices can be manually or automatically adjusted to receive the broadcast signal.

Authentication has the advantage of allowing a device to demand that a transmitting device proves that it is who it says it is to avoid hacks, viruses, and other threats. In addition, authentication adds privacy to user's broadcasts and limits the breadth of the broadcast so that unauthorized devices do not gain access to the content. Authentication can be enabled in embodiments of the invention from either the source or the destinations. Source-based authentication allows a receiving device to stipulate that certain transmitting addresses are either permitted or not permitted. Any other wireless streams are simply ignored.

In another aspect of source based authentication, an address can be associated with a limited group. To receive data sent to that address, you must join the group. This is advantageous in that every group member can send content in what is known as many-to-many communications. When a router, or a device serving as a router, sees a content packet addressed to a group's multicast address, it forwards the packet anyone else in the group served by that router. Source based authentication can be advantageous since it reduces the need for backwards transmissions to for authorization.

Destination based authentication, alternatively, requires a return transmission from the receiving device so the sending device can authenticate it.

If the content is securely transmitted, through unicast or multicast, then group management can coordinate who receives the content and how it happens. Group management involves creating and identifying a group of users that elect to join a group that enables content sharing. The group can form rules for content sharing based on, for example, levels of membership, types of content sharing, whether content sharing is automated or by request, and the like. Group management can be coordinated through various mechanisms, for example Internet sites or spontaneous ad hoc group formation as users are added and dropped as desired at the devices. Alternatively, a user can define who is in their group without knowing the other members by selecting on their device characteristics of users they would like to share content with. Third parties can then define themselves, or be defined, with characteristics that define groups in a variable dynamic. For example, a user can define that owners of a particular type of device, members of a certain gender, persons of a given age, anyone, persons with certain self defined music interests, etc. are part of their group and can access their wireless content. Alternatively, a user can select to exclude certain users or users with certain defined characteristics.

For example, in the event that a user enters a large group of users, for example through an Internet service that subscribes many users, that user can configure their device to permit authorized third parties to eavesdrop on content they are listening to on their wireless headphones. A third party, in turn, can continuously or intermittently monitor nearby wireless transmissions over the group's defined transmission channels. In the event that the third party comes in the vicinity of the first user and identifies the first user's wireless transmissions, the third party can either listen in to the content being listened to by the first user or request permission to do so. In this way, a sense of community is enhanced between users as content is shared in a spontaneous manner.

Additionally, display 116 can be configured to indicate local transmissions a user may tap into. In one embodiment, the display can be configured to indicate broadcast transmissions or secured transmissions the user has been authorized to listen to, an example of which may be transmissions from others of the same group. A user can then opt to listen to the selected open or authenticated transmission. In another embodiment, the display can be further configured to also indicate unavailable transmissions. A user can then request to enter a group or otherwise obtain authorization to listen to the otherwise unavailable transmission. In addition or as an alternative to a display, audio cues can be used to either provide the notification that can be described with a display or to inform a user they should look at the display. The use of audio cues can enhance a user's experience as the user is not required to monitor a display constantly to know it certain actions are required. In fact, omitting a display altogether can reduce the complexity, size, and cost of a device.

Secured transmissions and authentication of a user's rights to access another user's wireless content can be accomplished by various method and systems known in the art. For example, if 802.11 standards are used, WEP and WPA can be used to secure the wireless transmissions. Numerous other security standards for 802.11 and other forms of wireless communication are well known in the art and will not be discussed in further detail herein. It will be obvious to those skilled in the art in view of the disclosure herein, however, what those security methods are and how such security features can be combined with other aspects of the present invention. Regardless, any authentication protocols and authentication mechanisms, along with the authentication mechanism must be supported by all coordinated machines in order to work properly.

Those skilled in the art will appreciate that the embodiments and features of the portable media device 100 and the various modules therein may be practiced alone or in network environments with many types of computer system configurations, including media players, satellite radio receivers, terrestrial transmitters and receivers, personal computers, hand-held devices, multi-processor systems, microprocessor-based or programmable consumer electronics, network PCs, minicomputers, mainframe computers, and the like. Aspects of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

Embodiments of the invention may include computer-readable media 104 for carrying or having computer-executable instructions or data structures stored thereon. Such computer-readable media can be any available media that can be accessed by a portable device or general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a portable device or general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Although not required, the invention may be described in the general context of computer-executable instructions, such as program modules, being executed by computers in network environments. Generally, program modules include acts, routines, programs, objects, components, data structures, etc. that perform particular tasks or implement particular abstract data types. Computer-executable instructions, associated data structures, and program modules represent examples of the program code means for executing acts of the methods disclosed herein. The particular sequence of such executable instructions or associated data structures represents examples of corresponding acts for implementing the functions described in such acts.

The devices may also include a magnetic hard disk drive for reading from and writing to a magnetic hard disk, a magnetic disk drive for reading from or writing to a removable magnetic disk, or an optical disk drive for reading from or writing to removable optical disk such as a CD-ROM or other optical media. The drives and their associated computer-readable media provide nonvolatile storage of computer-executable instructions, data structures, program modules and other data. Although the exemplary environment described herein may employ a magnetic hard disk, a removable magnetic disk and/or a removable optical disk, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk, magnetic disk, optical disk, ROM or RAM, including an operating system, one or more application programs, other program modules, and program data. A user may enter commands and information through a touch pad, pointing device, or other input devices (not shown), such as a microphone, joy stick, game pad, satellite dish, scanner, or the like. These and other input devices are often connected to the processing unit through a universal serial bus (USB) or serial port interface coupled to system bus. Alternatively, the input devices may be connected by other interfaces, such as a parallel port, or a game port. A display device is also connected to system bus via an interface, such as video adapter.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for distributing media content to multiple users, comprising:

on a first media player device playing the selected media content;

wirelessly transmitting, directly from the first media player to a first headset associated with said first user, the selected media content such that said selected media content can be listened to by the first user via the first headset;

establishing a first wireless link from the first media player device to a second media player device, wherein the second media player device is associated with second headset associated with a second user, such that media from the second media player device is wirelessly transmitted to said second headphones for the second user to listen to media content from the second media player, wherein the first wireless link facilitates an authorization of the second headset for a direct communication with the first media player device;

establishing a second wireless link directly between said second headset and said first media player device in response to said second headset being authorized for a direct communication with said first media player device;

terminating said first wireless link in response to the configuring of the second wireless link; and wirelessly transmitting the selected media content directly from the first media player device to the authorized second user's headset via the second wireless link without the selected media content being received by any the second media devices.

2. A method as defined in claim 1, wherein the act of wirelessly transmitting is performed securely in a unicast transmission between the first media player device and the authorized headset associated with the additional users.

3. A method as defined in claim 1, wherein the act of wirelessly transmitting is performed securely in a multicast transmission from the first media player device to the authorized headset associated with the additional users.

4. A method as defined in claim 1, wherein the first and second wireless links are established using a wireless technology selected from 802.11 networks, Bluetooth networks, WiFi networks, cellular networks, and combinations thereof.

5. A method as defined in claim 1, wherein the act of playing the selected media content comprises playing audio content.

6. A method as defined in claim 1, wherein the act of playing the selected media content comprises playing a satellite radio feed.

7. A method as defined in claim 1, wherein the act of wirelessly transmitting the selected media content from the first media player device directly to authorized headphones further comprises: sharing group data from the first personal media player device; and using the group data to configure unauthorized headphones as the authorized headphones.

8. A method as defined in claim 1, wherein the act of wirelessly transmitting the selected media content from the first media player device directly to authorized headphones further comprises: sharing group data from the first personal media player device to other personal media player devices associated with additional users; and performing an authentication process where the other personal media player device uses the group data to configure unauthorized headphones as the authorized headphones.

9. A personal media player device configured to perform the method in claim 1.

10. A method for obtaining selected media content from a first media player device associated with a first user, wherein the first media player device wirelessly transmits the media content to a first headset such that said media content can be listened to said first user via the headphones, the method comprising:
   establishing, between a second media player device associated with a second user and the first media player, a first wireless link,
      wherein the second media player device is associated with a second headset associated with the second user, such that media from the second media player device is wirelessly transmitted to said second headset for the second user to listen to media content from the second media player,
      wherein the first wireless link facilitates an authorization of the second headset for direct communications with the first media player device;
   receiving, via the first wireless link, an initial transmission from the first media player device;
   establishing, by the second media player, a second wireless link directly between the second headset and the first media player device;
   terminating said first wireless link in response to the second wireless link being established; and
   wirelessly receiving, at the second wireless headset, the selected media content via the second wireless link, such that the media content is not received by the second media player device.

11. A method as defined in claim 10, wherein the act of wirelessly receiving the media content comprises receiving a unicast transmission that is only accessible by authorized wireless headsets.

12. A method as defined in claim 10, wherein the act of wirelessly receiving the media content comprises receiving a multicast transmission that is only accessible by authorized wireless headsets can receive the selected media content.

13. A method as defined in claim 10, wherein the selected media content further comprises at least one of saved audio content, a satellite radio feed, a digital image, text or video.

14. A wireless headset configured to perform the method of claim 10.

15. A method as defined in claim 10, wherein collecting group data is performed by a personal media player device associated with the first user and the personal media player device associated with the first user using the group data to configure the wireless headset associated with the first user.

16. A community enabled personal wireless media player system, comprising:
   a primary media player device associated with a primary user, comprising:
      a memory in which media content is stored;
      a primary headset wirelessly connected to said primary media player and associated with said primary user;
      a wireless receiving module configured to receive media content;
      a media control module configured to read media content from the memory source and/or communicated media content received from the wireless receiving module;
      an authorization module configured to authorize headsets and media player devices for communication with said primary media player device;
      a wireless transmitting module configured to transmit the media content read by the media control module,
         wherein the wireless transmitting module is further configured to perform a method comprising the steps of:
            establishing a first link with one or more secondary media player devices associated with one or more secondary users,
               wherein the secondary media player devices are each wirelessly connected to a secondary headset associated with one of said secondary users;
               wherein the first link facilitates an authorization of the secondary headsets;
            establishing a second wireless link directly between the primary media player device and each of said secondary headsets in response to each of the secondary headsets being authorized;
            terminating the first link to each of said secondary media player devices in response to the establishing of said second wireless link to each of said secondary headsets;
            wirelessly transmitting the read media content via the second wireless link directly from the primary media player to each of said authorized secondary headsets without the read media content being received by any of said secondary media player devices.

17. A system as defined in claim 16, wherein the authorization module and the transmitter module are configured to coordinate unicast transmission between devices.

18. A system as defined in claim 16, wherein the authorization module and the transmitter module are configured to coordinate multicast transmission between the primary media player device and the authorized secondary headsets wherein the primary media player device can serve as a router to relay wireless transmissions.

19. A system as defined in claim 16, wherein the media control module comprises a digital audio player.

20. A system as defined in claim 16, wherein the memory source additionally stores authorization data.

21. A system as defined in claim 16, wherein the primary headset comprises wireless headphones.

22. A system as defined in claim 16, wherein the wireless receiving module is configured to receive communicated media content from a satellite radio feed.

* * * * *